April 4, 1967
G. D. MANVILLE
3,311,989
LEVEL AND STRAIGHT-EDGE GAGE COMBINATION
AND IMPROVED ATTACHMENT THEREFOR
Filed Sept. 24, 1965
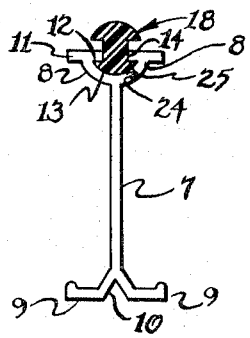
Fig. 1
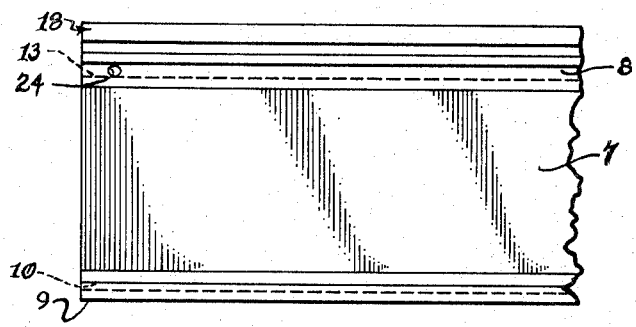
Fig. 2
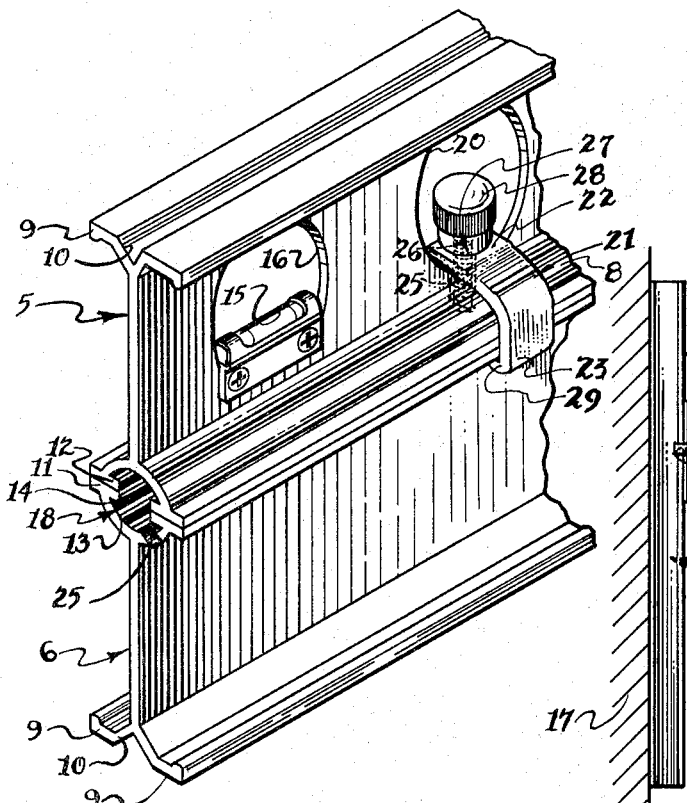
Fig. 4
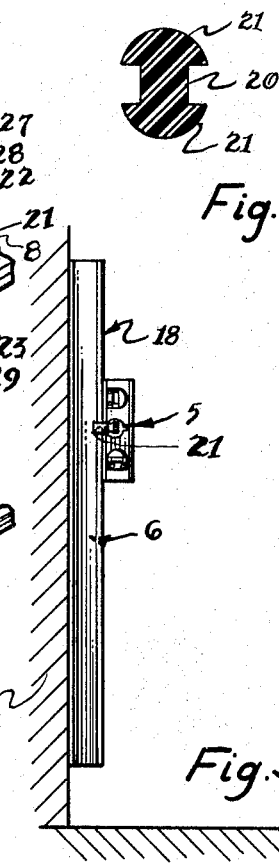
Fig. 3
Fig. 5
INVENTOR
George Dewey Manville

United States Patent Office 3,311,989
Patented Apr. 4, 1967

3,311,989
LEVEL AND STRAIGHT-EDGE GAGE COMBINATION AND IMPROVED ATTACHMENT THEREFOR
George Dewey Manville, 35211 Adams Lane, Yucaipa, Calif. 92399
Filed Sept. 24, 1965, Ser. No. 489,990
7 Claims. (Cl. 33—207)

My present invention relates to an improved level and straight-edge gage combination including novel and functional shock absorbing means that can be utilized for attaching one to the other, and is a continuation-in-part of my copending application Ser. No. 382,122, for a Level and Straight-Edge Combination, filed July 13, 1964.

In my copending application I describe, show and claim an improved level and straight-edge combination fabricated from a uniquely shaped metal extrusion in which the level and straight-edge components are joined along one of their edges; the level being positionable at any desired location along the straight-edge.

In my copending application I point out the need to protect straight-edge gages and levels against the normal rough handling and use to which they are commonly subjected; and the requirement from time to time to repair and realign both components to maintain their requisite accuracy and reliability.

It is an object of my present invention to provide a novel shock absorbing means for use in combination with the straight-edge gage to which the subject matter of my copending patent application pertains, which fastening means has an important function in connection with the straight-edge member to sustain normal shock and vibration resulting from use in construction operations.

It is a further object of my present invention to provide an improved level and straight-edge combination joined together with an intermediate continuous shock absorbing edge attachment that also prevents relative misalignment between the gaging components.

It is a still further object of my present invention to provide a resilient attachment means for combining a level and straight-edge having mutually connectable edges, the attachment means per se being resistant to corrosion, shock, vibration, and general abuse.

An it is still another object of my present invention to provide a novel and functional shock absorbing means for combining a level and straight-edge gage combination having mutually connectable edges; the shock absorbing means being of simple construction and economical to manufacture.

Briefly, my invention comprises a level and straight-edge gage combination in which one edge of the level and one edge of the straight-edge gaging components are mutually adapted for attachment together in relatively slidable engagement along their total extent, and a continuous resilient shock absorbing attachment means contained in one edge of the straight-edge gage; this means being symmetrical about its center and attachable at either end thereof in the attachment edge of either component.

My present invention and other objects and advantages inherent therein will be more clearly appreciated by reference to the ensuing specification and appended drawings in which FIG. 1 is an end elevational view in cross-section showing a straight-edge gage with the attachment means of my present invention mounted therein, FIG. 2 is a side elevational view showing the level and straight-edge combination component of FIG. 1, FIG. 3 is an enlarged cross-sectional view of the attachment means employed to join the level and straight-edge components together, FIG. 4 is a generally fragmentary view in perspective, taken from one end of the level and straight-edge combination, and the shock absorbing means of my present invention.

In FIG. 5 a preferred embodiment of my invention is shown wherein a level 5 and straight-edge gage 6 are each fabricated from a single extrusion of lightweight, corrosion-resistant, rigid and durable material such as aluminum or magnesium, for example.

As best shown in FIGS. 1 and 2, the shape of the extrusion is characterized by a web 7 of uniform thickness having one edge thereof divided into a pair of outwardly divergent legs 8, that define between them a continuous channel or receptacle 13, each leg 8 terminating in coextensive outer flanges 11 and inner flanges 12. The receptacle 13 between the inner flanges 12 of legs 8 communicates with a continuous space or slot 14 that extends along the entire edge of extrusion.

The opposite edge of web 7 terminates with a pair of coextensive upturned flanges 9 having a central V-groove 10 between them.

Referring again to FIG. 4, the level 5 is provided with spirit vials in the customary manner; the horizontal vial 15 being shown in the fragmentary view, mounted in a circular aperture 16 cut through web 7 of the extrusion.

Combined with the straight-edge gage 6 for use in plumbing a door jamb, wall stud, or like vertical structural member represented at 17, my present invention is directed to a novel shock absorbing means in the form of an elongated member or strip 18 extruded of a resilient, elastic material such as vinyl for example, characterized by a web 20 having an enlarged bead or bulb 21 integrally formed on each edge thereof.

In the present example, each bulb 21 is generally hemispherical in shape and dimensioned to fit snugly within the respective edge receptacle 13 of level 5 and straight-edge gage 6 components. The width of the web 20 of the attachment strip 18 is likewise dimensioned for a slip-fit in the aligned continuous slots 14 of gage components 5 and 6. The resilient strip 18 may be mounted in either the straight-edge gage 6 or the level 5. It is preferred, however, that shock absorbing strip 18 be mounted in the straight-edge wherein a twofold purpose may be served. It is common practice in the carpentry and masonry trades to tap the straight-edge gage, with the level attached thereto, against a structural member to align the same either vertically or horizontally, prior to permanently fastening it in place. The resilient strip 18 acts as a cushion and effectively prevents damage or marring of the edge of straight-edge 6. Moreover, the attachment strip 18 damps the shock of the tapping, preventing damage to the spirit vials 15 of the level 5. An important feature embodied in the cross-sectional configuration of strip 18 becomes evident when the exposed bulb 21 becomes worn and damaged; it merely being necessary to reverse the strip in the receptacle to provide a fresh, unmarred bulb therein.

It can be seen that a secondary function of strip 18 is obtained wherein the level 5 and straight-edge gage 6 are maintained in close, uniform, edge-to-edge, abutting relationship.

For example, it is not always necessary to unscrew or unlock the type of fastening means disclosed in my copending patent application, supra, to manually move or slide the level 5 along the straight-edge 6, a light pressure being all that is necessary. It is contemplated that the distance between bulbs 21 is such that flanges 11 and 12 of level 5 and straight-edge 6 are urged by the uniform mechanical pressure inherent in the material of the strip 18.

It can further be seen that the level 5 cannot become cocked or misaligned relative to straight-edge 6 so long as strip 18 is properly installed.

For ordinary use it is recommended that a mechanical bracket be used to better secure the level 5 to straight-edge 6, the preferred form of bracket being shown in FIG. 4, positioned in aperture 20 provided in level 5.

The bracket, which is U-shaped, has a contoured bight 22 having parallel legs 23 extending therefrom straddling each side of the combined level 5 and straight-edge gage 6.

In the bottom of aperture 20 a threaded bore 25 is provided extending partially through the section of level 5 and bottoming just short of receptacle 8. An identical threaded bore 26 is provided through the bight 22 of bracket 21, and a threaded stud 27 is threadably extended through bracket bore 26 and aperture bore 25 which is aligned therewith. A knurled head 28 is provided on the end of stud 27 for manual turning thereof.

The lower ends of bracket legs 23 are provided with inturned hook-like flanges 29 which fit around the abutting receptacle flanges 11 of level 5 and straight-edge gage 6 as shown in FIG. 4.

It can be seen that as stud 27 is turned in the appropriate direction in aperture bore 25, bracket 21 moves upwardly toward knurled head 28 bringing leg flanges 29 to bear under flanges 11 of level 5 and straight-edge 6 and effectively clamps them together.

Bracket 21 forms no part of the present invention, being described, shown and claimed in my copending application Ser. No. 382,122, supra.

The attachment strip 18 may be secured in place if desired in either the level 5 or straight-edge 6, by drilling and tapping a small bore 24 and installing therein a set screw 25 as best shown in FIGS. 1 and 4.

While the foregoing detailed description and drawings illustrate one form my invention may take, the example by no means limits the scope of my invention as numerous modifications and equivalent forms will occur to those skilled in the art.

I claim:

1. A level and straight-edge gage combination comprising a straight-edge gage and a level gage which are joined together with shock absorbing attachment means, said straight-edge gage and said level gage being formed from an elongated extrusion characterized by a web of uniform thickness and bounded on one edge thereof with a pair of spaced apart curved legs defining between them a continuous receptacle, each of said legs terminating in normally coextensive flanges partially enclosing said receptacle, a continuous slot formed between said flanges which slot communicates with the interior of said receptacle, flange means on the opposite edge of said web adapted to gage the straightness of a surface engaged thereby, said straightness gage being formed of a relatively long length of said extrusion and said level gage carrying level sensing means and being formed of a relatively short length of said extrusion, said straightness gage and said level gage being placed together edge to edge with said continuous slots in alignment, said shock absorbing attachment means comprising elongated attachment means of resilient material formed with two enlarged portions dimensioned and shaped to fit in the receptacles of said straightness gage when and said level gage in edge to edge relationship, said enlarged portions being joined by an integral web extending through the aligned continuous slots along the entire extent of said straightness gage, the exposed enlarged portion of said attachment means on each end of said level gage protecting the edge of said straight-edge gage having said continuous slot.

2. The shock absorbing means of claim 1 in which said elongated attachment means is extruded of a flexible plastic material.

3. The shock absorbing means of claim 1 in which said elongated attachment means is characterized by a web slightly thinner in section than said slots, having on each edge thereof an enlarged portion slightly smaller than the interior of said receptacle.

4. An improved level and straight-edge gage combination comprising:

(a) a first elongated extrusion defining said level, the cross-section of said extrusion being characterized by a web of uniform thickness carrying spirit level vials and bounded on one edge thereof with a pair of spaced apart legs defining between them a continuous receptacle, each of said legs terminating in normally coextensive flanges partially enclosing said receptacle, (b) a continuous slot defined between said flanges and communicating with the interior of said receptacle, (c) said straight-edge being formed of a second elongated extrusion characterized by a cross-section identical to the cross-section of said first extrusion, the edge thereof opposite said receptacle being adapted to gage the straightness of a surface engaged thereby, said level and straight-edge gage being assembled with their respective receptacle-containing edges together and said continuous slots in alignment, (d) and intermediate shock absorbing attachment means extending the full length of said straight-edge gage and retained in said receptacles that permits said level to be slidably moved from one location to another along said straight-edge gage.

5. The combination recited in claim 4 in which said intermediate attachment means is formed of a resilient plastic material.

6. The combination recited in claim 4 in which said intermediate attachment means is formed of an elongated extrusion of resilient plastic material.

7. The combination recited in claim 4 in which said intermediate attachment means is an elongated extrusion of resilient plastic material having a cross-section characterized by a web of substantially the same width as the width of said continuous slots, and an enlarged bulb on each edge of said web, said bulbs being dimensioned to fit snugly within said edge receptacles of said level and straight-edge gage.

References Cited by the Examiner

UNITED STATES PATENTS

| | | | |
|---|---|---|---|
| 641,838 | 1/1900 | Cavanagh | 287—20.92 |
| 991,603 | 5/1911 | Brooks | 52—729 X |
| 1,620,469 | 3/1927 | Kirkhoff | 33—211 |
| 2,266,464 | 12/1941 | Kraft | 287—20.92 |
| 2,694,861 | 11/1954 | Zelnick | 33—207 X |
| 2,898,643 | 8/1959 | Bush et al. | 287—20.92 |
| 2,993,281 | 7/1961 | Dock | 33—213 X |
| 3,160,249 | 12/1964 | Pavelcka | 287—20.92 |

LEONARD FORMAN, *Primary Examiner.*

L. V. ANDERSON, *Assistant Examiner.*